United States Patent [19]

Diveley

[11] 3,856,898

[45] Dec. 24, 1974

[54] SEPARATION OF AMORPHOUS SULFUR AND O,O-DI($C_1$-$C_8$ ALKYL) PHOSPHORO-CHLORIDOTHIOATE

[75] Inventor: William Russell Diveley, Wilmington, Del.

[73] Assignee: Hercules Incorporated, Wilmington, Del.

[22] Filed: Jan. 21, 1974

[21] Appl. No.: 435,353

Related U.S. Application Data

[63] Continuation of Ser. No. 237,533, March 23, 1972, abandoned.

[52] U.S. Cl. .................. 260/990, 260/960, 260/986
[51] Int. Cl. ............................................. C07f 9/14
[58] Field of Search ...................................... 260/990

[56] References Cited
UNITED STATES PATENTS

| | | | |
|---|---|---|---|
| 3,089,890 | 5/1963 | Chupp et al. ................... | 260/986 X |
| 3,502,750 | 3/1970 | Anglaret et al. ................ | 260/990 X |

OTHER PUBLICATIONS

Smith, "Inorganic Chemistry," The Century Co., New York, (1917) 3rd., Ed. p. 413.

Primary Examiner—Anton H. Sutto
Attorney, Agent, or Firm—George H. Hopkins

[57] ABSTRACT

Disclosed is a process for treating a mixture comprising O, O-di($C_1$-$C_8$ alkyl) phosphorochloridothioate and amorphous sulfur at a concentration up to about one-third of the weight of the phosphorochloridothioate. In this process the mixture is established in a first temperature range in which substantially all of the sulfur can go into solution without substantial decomposition of the phosphorochloridothioate, and maintained in that range until substantially all of the sulfur does go into solution. The resulting solution is established in a temperature range in which the dissolved sulfur cyrstallizes, and is maintained in that range until sulfur crystallization is substantially complete. The crystallized sulfur then is separated by settlement (filtration, decantation, centrifugation, or the like) from the mother liquor. In one embodiment the mother liquor, composed of the phosphorochloridothioate dissolved in a solvent, is treated by a procedure which includes distillation, to obtain O,O-di($C_1$-$C_8$ alkyl) phosphorochloridothioate.

13 Claims, No Drawings

SEPARATION OF AMORPHOUS SULFUR AND O,O-DI(C1-C8 ALKYL) PHOSPHORO-CHLORIDOTHIOATE

This is a continuation of application Ser. No. 237,533 filed Mar. 23, 1972, now abandoned.

This invention is in the chemical arts. It has to do with that branch of organic chemistry pertaining to thiophosphoric acid esters.

More particularly, this invention relates to a process for the treatment and separation of a mixture comprising O,O-di ($C_1$-$C_8$ alkyl) phosphorochloridothioate and amorphous sulfur at a concentration up to about one-third of the weight of the phosphorochloridothioate.

In at least one process for making O,O-di($C_1$-$C_8$ alkyl) phosphorochloridothioate there is obtained a reaction mixture comprising amorphous, generally polymeric sulfur and generally, but not necessarily, in solution in an inert liquid reaction medium O,O-di($C_1$-$C_8$ alkyl) phosphorochloridothioate. Heretofore, the phosophorochloridothioate (and liquid reaction medium, if any is present) has been separated from the sulfur by distillation. One reason is that amorphous sulfur is very difficult to remove by filtation or other settlement procedures. Amorphous sulfur, however, is thermally instable and, particularly when reaching the terminal stages of the distillation, when concentrations of diluents such as phosphorochloridothioate, liquid reaction medium, if any, and phosphorus containing by-products, are low, and concentration of the amorphous sulfur is high, can release suddenly enough heat to cause an explosion with resulting damage to equipment, loss of material, and possible injury to personnel.

Consequently, there is a need for a process in which the phosphorochloridothioate and amorphous sulfur are separated while avoiding this potentially hazardous condition. This invention provides such a process.

In summary, according to the process of this invention, a mixture comprising O,O-di($C_1$-$C_8$ alkyl) phosphorochloridothioate and amorphous sulfur at a concentration up to about one-third by weight of the phosphorochloridothioate is established in a first temperature range in which substantially all of the sulfur can go into solution without substantially decomposition of the phosphorochloridothioate, and maintained in that range until substantially all of the sulfur does go into solution. When the mixture comprises an inert solvent in which the phosphorochloridothioate is in solution, the sulfur is dissolved by the solution. However, when there is no inert solvent present, the sulfur is dissolved by the phosphorochloridothioate. In either case the resulting solution then is established in a lower temperature range in which the solubility of the dissolved sulfur is substantially decreased, and is maintained in that range until precipitation of dissolved sulfur is substantially complete. The precipitated sulfur not only is thermally more stable than the amorphorous sulfur, but is crystalline. Accordingly, it is readily separated by settlement (for example, filtration, centrifugation, decantation, or the like) from the mother liquor. The mother liquor, if desired, can be treated by a procedure which can include distillation, to isolate the phosphorochloridothioate.

The alkyl groups in the O,O-di($C_1$-$C_8$ alkyl) phosphorochloridothioate are alkyl groups having 1–8 carbon atoms. In some embodiments the alkyl groups are the same. In other embodiments they are different. Examples of $C_1$-$C_8$ alkyl groups include both straight and branched chain alkyls such as, for example, methyl, ethyl, propyl, isopropyl, butyl, sec.-butyl, t-butyl, and the like, up through n-octyl and isomers thereof.

The mixture comprising amorphous sulfur and O,O-($C_1$-$C_8$ dialkyl) phosphorochloridothioate in most instances is the reaction mixture obtained in the chlorination of O,O- O,O-($C_1$-$C_8$ dialkyl) hydrogen phosphorodithioate or a salt thereof. While the chlorination reaction can be carried out "neat," usually it is performed in an inert liquid reaction medium and preferably one in which the phosphorochloridothioate is soluble. Examples of a preferred liquid reaction medium include benzene, toluene, xylene, carbon tetrachloride, chloroform, and the like. However, in case the chlorination reaction is carried out "neat," it is usually desirable to add to the mixture an inert liquid, and preferably one that is a solvent for the phosphorochloridothioate, to make the mixture more readily stirrable. For the same reason, it is frequently desirable when the chlorination reaction is carried out in an inert liquid reaction medium to further dilute the reaction mixture with that liquid reaction medium before or while establishing the reaction mixture in the first temperature range according to this invention. However, caution must be taken in some embodiments not to have too much inert liquid reaction medium present, because beyond a maximum concentration dependent on the inert liquid reaction medium the solubility of sulfur is inhibited rather than enhanced. In these embodiments the optimum concentration is dependent upon the inert liquid reaction medium, the particular phosphorochloridothioate and quantity of it, and the quantity of amorphous sulfur. On the other hand, the optimum concentration of the inert liquid reaction medium can be readily ascertained in a given situation by admixing with various samples of the mixture an inert liquid reaction medium at different volumetric ratios at the temperatures to be employed.

The first temperature range in which the mixture is established and maintained depends in general on the phosphorochloridothioate and quantity of it, the quantity of amorphous sulfur, and the inert liquid, if any. In general, however, satisfactory results are obtained when the temperature range is 90°–130°C. However, higher and lower temperatures are within the broader concepts of this invention.

In establishing and maintaining the mixture in the elevated temperature range until substantially all of the sulfur has gone into solution, the mixture preferably is stirred or agitated to avoid local overheating and to facilitate dissolution of the sulfur. The period of time for the sulfur to go into solution varies with the quantity of sulfur, the quantity of phosphorochloridothioate and the quantity of inert liquid reaction medium, if any. In general a period in the range from about ¼ hour to about 2 hours gives satisfactory results. However, longer and shorter periods of time are within the broader concepts of this invention.

The temperature range in which the sulfur-phosphorochloridothioate solution is established and maintained until precipitation of dissolved sulfur is substantially complete is dependent on the quantities of sulfur, phosphorochloridothioate, and inert liquid reaction medium, if any, that are present. In genral, however, temperatures of 0°–20°C. give satisfactory results.

The crystallized sulfur is thermally more stable and, compared to the amorphous sulfur, readily separated from the mother liquor by settlement procedures. Consequently, the next step of the process is to separate the crystallized sulfur from the phosphorochloridothioate. This is done by filtration, decantation, centrifugation, or the like. In some of those emboidments in which an inert liquid reaction medium is present the mother liquor is then subjected to a treatment including distillation to separate phosphorochloridothioate from the inert liquid reaction medium. This treatment in preferred ones of these embodiments includes water washing of the phosphorochloridothioate to remove unwanted phosphorochloridoates, when such are present.

The sulfur solution and sulfur precipitation steps of the process of this invention generally are carried out at atmospheric pressure. However, under the broader concepts of this invention they separately or together can be carried out under subatmospheric pressure or superatmospheric pressure.

The best mode now contemplated of carrying out the invention is illustrated by the following working examples of two specific embodiments of the process of this invention. This invention is not limited to these specific embodiments. In these examples, parts by weight are represented by "w."

EXAMPLE 1

This example illustrates the practice of a preferred embodiment of the process of this invention in the production of O,O-diethyl phosphorochloridothioate.

A solution of O,O-diethyl phosphorodithioate (139.5 w) in toluene (71.3 w) is treated with chlorine (78.2 w) at −5°–0° C. as described in the U.S. Pat. No. 3,502,750, to Anglaret et al. After the chlorination reaction is complete, toluene (50 w) is added and the resulting mixture is treated with $H_2S$ (17.0 w) by passing it into the mixture at 0°–25° C. Additional $H_2S$ is added, if needed (as established by the potassium iodide-starch test) to decompose any remaining $S_2Cl_2$ present. The result is a mixture comprising amorphous, generally polymeric sulfur. The mixture, while being stirred, is established in a nitrogen atmosphere at 120°–130° C. and maintained at this temperature until the amorphous sulfur has dissolved. The resulting solution is cooled to a temperature less than about 10° C. and agitation is stopped. While the solution is being cooled, sulfur precipitates as well-defined crystals. After maintaining the resulting mixture of crystalline sulfur and solution quiescent for about ½–1 hour to percipitate as much of the sulfur as possible and facilitate crystal growth, the mixture is filtered. The filter cake of crystalline sulfur is washed twice on the filter with toluene (25 w each wash). The filtrate plus the drainage from each wash is combined and distilled under reduced pressure. After the solvent is removed, distillation is continued to obtain the desired product which distills at 88° C. at 16 millimeters of mercury pressure as a water white liquid. The desired product consists essentially of O,O-diethyl phosphorochloridothioate.

EXAMPLE 2

This example illustrates the practice of a preferred embodiment of the process of this invention in the production of O,O-dimethyl phosphorochloridothioate.

A solution of O,O-diemthyl hydrogen phosphorodithioate (141.5 w) in toluene (83.5 w) is chlorinated at −5°– 0°C. with chlorine (96.9 w) as described in Example 1.

Toluene (72 w) is added to the resulting reaction mixture. The thus diluted reaction mixture is treated with $H_2S$ (20.0 w) at 0°–15° C.

The mixture that results, a solution with solid amorphous polymeric sulfur in suspension, is established at 100°–105°C. and maintained at this temperrature until the amorphous sulfur has gone into solution.

The solution that results is cooled to less than 10° C. and permitted to stand without agitation for 1 hours. During this period of time crystalline sulfur precipitates. The mixture of crystalline sulfur and solution is filtered and the filter cake washed twice with toluene (25 w each wash). The filtrate and toluene washes are combined and distilled under reduced pressure to remove the toluene. The residue is then distilled at 65°C. at 15 millimeters of mercury pressure to obtain the desired product which essentially of O,O-dimethyl phosphorochloridothioate.

Thus, there is provided a process for separating amorphous sulfur and O,O-di($C_1$-$C_8$ alkyl) phosphorochloridothioate with a minimum of risk of explosion because of the thermally unstable sulfur.

A feature of advantage of the process is that, after removal of the crystalline sulfur, the subsequent distillation is facilitated and can be safely and more economically conducted on a continuous basis. This is desirable from a safety viewpoint because the phosphorochloridothioate and organophosphorus residues and by-products are relatively thermally unstable. Continuous distillation avoids heating large quantities of such mixtures at any one time.

Still another feature of advantage of the process of this invention is that removal of most of the sulfur from the thiophosphoryl chloride before distillation of the solution also permits washing of the phosphorochloridothioate or solution thereof with water distillation to remove small amounts of unwanted phosphorochloridoates. These phosphorochloridoates are known to hydrolyze many times fster than O,O-di($C_1$-$C_8$ alkyl) phosphorochloridothioates. The hydrolyzed phosphorochloridoates form water-soluble products and, therefore, are removed in the aqueous phase when it is separated from the organic phase containing the desired phosphorochloridothioate.

Other features, advantages and specific embodiments of this invention will become readily apparent to those exercising ordinary skill in the art after reading the foregoing disclosures. Such specific embodiments are within the scope of the claimed subject matter unless expressly indicated to the contrary by claim language. Moreover, while specific embodiments of this invention have been described in considerable detail, variations and modifications of them can be effected without departing from the spirit and scope of the invention as disclosed and claimed.

The expression "consisting essentially of" as used in this specification excludes any unrecited substance at a concentration sufficient to substantially adversely affect the essential properties and characteristics of the composition of matter being defined, while permitting the presence of one or more unrecited substances at concentrations insufficient to substantially adversely affect said essential properties and characteristics.

I claim:

1. In a process for making O,O-($C_1$-$C_8$ dialkyl) phosphorochloridothioate by the chlorination at $-5°-0°$ C. of O,O-($C_1$-$c_8$ dialkyl) hydrogen phosphorodithioate or a salt thereof, followed by treatment with $H_2S$ at $0°-25°$ C., whereby a reaction mixture consisting essentially of O,O-($C_1$-$C_8$ alkyl) phosphorochloridothioate and thermally unstable amorphous sulfur at a concentration up to about one-third of the weight of said phosphorchloridothioate is obtained, the improvement which comprises: establishing said mixture in a first temperature range in which substantially all of said amorphous sulfur can go into solution without substantial decomposition of the phosphorochloridothioate, and maintaining it in that range until substantially all of said sulfur has gone into solution; establishing the resulting solution in a lower temperature range in which the solubility of the sulfur in said solution is substantially decrease, and maintaining said solution in said range until precipitation of sulfur is substantially complete, whereby crystalline sulfur is obtained; and separating by settlement substantially all of the precipitated sulfur from the mother liquor.

2. A process according to claim 1 in which said first temperature range is about 90°–130° C.

3. A process according to claim 2 in which said lower temperature range is 0°–20° C.

4. A process according to claim 3 in which said mixture comprises an inert liquid.

5. A process according to claim 4 in which said inert liquid is a solvent for said phosphorochloridothioate and said phosphorochloridothioate is in solution in said inert liquid.

6. A process according to claim 5 in which phosphorochloridothioate is separated from the sulfur depleted solution by distillation.

7. A process according to claim 6 in which the inert liquid is toluene.

8. A process according to claim 7 in which the phosphorylchloridothioate is O,O-dimethyl phosphorochloridothioate.

9. A process according to claim 8 in which said first tempterure range is 90°–105° C.

10. The process according to claim 7 in which the phosophorochloridothioate is O,O-diethyl phosphorochloridothioate.

11. A process according to claim 10 in which said first temperature range is 120°–130° C.

12. A process according to claim 6 in which said sulfur depleted solution is water washed and then distilled to separate therefrom phosphorochloridothioate.

13. A process according to claim 12 in which the sulfur depleted solution is distilled to first remove said solvent therefrom and then to separate phosphorochloridothioate therefrom.

* * * * *